(12) United States Patent
Watanabe et al.

(10) Patent No.: US 9,346,510 B2
(45) Date of Patent: May 24, 2016

(54) ATTITUDE CONTROLLER AND SADDLE RIDING TYPE VEHICLE HAVING THE SAME

(75) Inventors: Hiroto Watanabe, Shizuoka (JP);
Hiroyuki Inoue, Shizuoka (JP);
Takahiro Fujii, Shizuoka (JP);
Yoshimichi Seki, Shizuoka (JP);
Akihiro Shiigai, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/235,119

(22) PCT Filed: Jul. 27, 2012

(86) PCT No.: PCT/JP2012/004815
§ 371 (c)(1),
(2), (4) Date: Feb. 21, 2014

(87) PCT Pub. No.: WO2013/014945
PCT Pub. Date: Jan. 31, 2013

(65) Prior Publication Data
US 2014/0200780 A1    Jul. 17, 2014

(30) Foreign Application Priority Data

Jul. 28, 2011   (JP) .................... 2011-165556

(51) Int. Cl.
*B62J 99/00*      (2009.01)
*B62J 27/00*      (2006.01)
(Continued)

(52) U.S. Cl.
CPC ............... *B62J 99/00* (2013.01); *B60T 8/1706* (2013.01); *B60T 8/17554* (2013.01); *B60W 10/02* (2013.01); *B60W 10/06* (2013.01); *B60W 10/184* (2013.01); *B60W 30/04* (2013.01); *B60W 30/045* (2013.01); *B62J 27/00* (2013.01);
(Continued)

(58) Field of Classification Search
None
See application file for complete search history.

(56) References Cited

U.S. PATENT DOCUMENTS

2005/0080543 A1*  4/2005  Lu et al. ..................... 701/70
2009/0088298 A1   4/2009  Iwashita et al.
(Continued)

FOREIGN PATENT DOCUMENTS

DE       102 42 124 A1       3/2004
DE    10 2007 061 114 A1     6/2009
(Continued)

OTHER PUBLICATIONS

Official Communication issued in corresponding European Patent Application No. 12816909.1, mailed on Nov. 6, 2014.
(Continued)

*Primary Examiner* — Edwin A Young
*Assistant Examiner* — Timothy M Hannon
(74) *Attorney, Agent, or Firm* — Keating and Bennett, LLP (57) ABSTRACT

An attitude controller eliminates a skid motion of a banked vehicle when travelling through a curve. The attitude controller includes a lateral acceleration sensor that obtains lateral acceleration, as rightward or leftward accelerations, acting on a vehicle of a motorcycle, a bank angle detector that detects a bank angle of the vehicle, and a longitudinal force controller that decreases, independently of each of the wheels, an absolute value of a longitudinal force as the sum of forward and backward forces acting on front and rear wheels based on the obtained lateral acceleration and the detected bank angle.

13 Claims, 8 Drawing Sheets

(51) Int. Cl.
  *B60T 8/17* (2006.01)
  *B60W 10/02* (2006.01)
  *B60W 10/06* (2006.01)
  *B60T 8/1755* (2006.01)
  *B60W 10/184* (2012.01)
  *B60W 30/04* (2006.01)
  *B60W 30/045* (2012.01)
  *G05D 1/08* (2006.01)
  *B62M 7/04* (2006.01)
  *B62K 3/00* (2006.01)

(52) U.S. Cl.
  CPC ....... *G05D 1/0891* (2013.01); *B60W 2030/043* (2013.01); *B60W 2520/125* (2013.01); *B60W 2520/14* (2013.01); *B60W 2520/18* (2013.01); *B60W 2710/027* (2013.01); *B60W 2710/0666* (2013.01); *B60W 2710/182* (2013.01); *B60W 2720/106* (2013.01); *B60W 2720/30* (2013.01); *B60Y 2200/12* (2013.01); *B62J 2099/002* (2013.01); *B62K 3/007* (2013.01); *B62K 2207/00* (2013.01); *B62K 2207/02* (2013.01); *B62M 7/04* (2013.01)

(56) References Cited

U.S. PATENT DOCUMENTS

| | | |
|---|---|---|
| 2009/0265058 A1 | 10/2009 | Hasegawa et al. |
| 2011/0172881 A1 | 7/2011 | Seidel et al. |

FOREIGN PATENT DOCUMENTS

| | | |
|---|---|---|
| JP | 2006-153479 A | 6/2006 |
| JP | 2006-240491 A | 9/2006 |
| JP | 2009-079749 A | 4/2009 |
| JP | 2009-257974 A | 11/2009 |
| JP | 4402379 B2 | 1/2010 |
| WO | 2007/107935 A1 | 9/2007 |
| WO | 2011/072942 A1 | 6/2011 |

OTHER PUBLICATIONS

Pacejka, H., "Tyre and Vehicle Dynamics", Butterworth-Heinemann, Dec. 31, 2002, pp. 511-521.
Official Communication issued in International Patent Application No. PCT/JP2012/004815, mailed on Oct. 30, 2012.

* cited by examiner

ATTITUDE CONTROLLER AND SADDLE RIDING TYPE VEHICLE HAVING THE SAME

BACKGROUND OF THE INVENTION

1. Field of the Invention

The present invention relates to an attitude controller for a vehicle that banks while traveling through a curve, and a saddle riding type vehicle including the attitude controller.

2. Description of the Related Art

Figure 8:
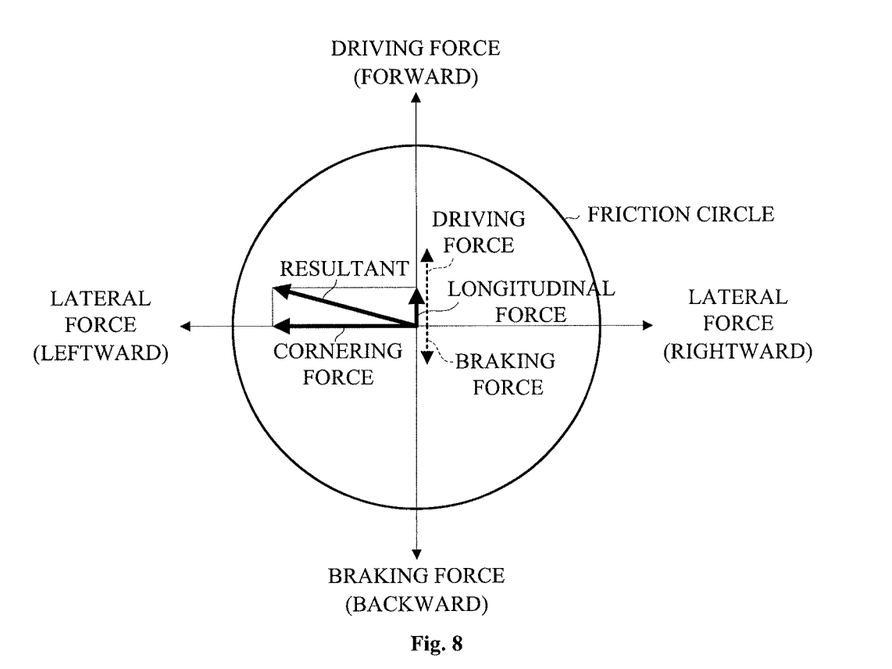
FIGS. 8 and 9 are explanatory views each illustrating a relationship between a force generated in a wheel and a friction circle.
Figure 9:
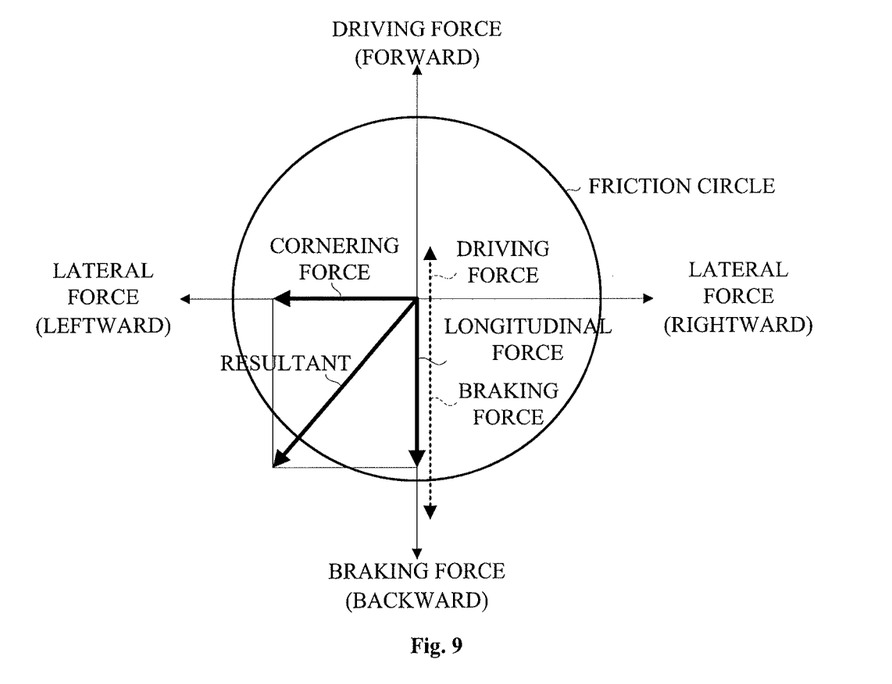

A mechanism to detect a skid motion of a wheel while a vehicle travels through a curve has been described conventionally with the use of a friction circle. The friction circle is a circle representing the maximum tolerance amount of a gripping force of a wheel. The skid motion of a wheel is described with reference to FIGS. 8 and 9. FIGS. 8 and 9 each illustrate a relationship between a force generated in the wheel and the friction circle.

FIG. 8 illustrates a relationship between a force generated in the wheel when a vehicle travels through a curve while maintaining a stable state and the friction circle. When the resultant of a longitudinal force, as the sum of a forward drive force and a backward braking force, and a cornering force generated laterally when travelling through a curve falls within the friction circle, the wheel rotates stably with no skid.

FIG. 9 illustrates a relationship between a force generated in the wheel when the vehicle travels through a curve with a skid motion and the friction circle. When the resultant of the vertical force, as the sum of the drive force and the braking force, and the cornering force generated when travelling through a curve lies outside the friction circle, the wheel skids to cause the vehicle to generate a skid motion. The skid motion of the vehicle leads to an unstable attitude of the vehicle.

An attitude controller of a four-wheeled vehicle is well-known and controls the resultant during traveling through a curve. On the other hand, a saddle riding type vehicle is banked, which differs from driving a four-wheeled vehicle. Thus, the attitude controller of a four-wheeled vehicle is not applicable to a saddle riding type vehicle. Accordingly, Japanese Patent 4402379 discloses an attitude controller specifically for a saddle riding type vehicle when travelling through a curve.

Japanese Patent 4402379 discloses an attitude controller performing a stabilizing method. In the method, output signals from a lateral acceleration sensor installed on the vehicle are evaluated to determine whether or not a braking force is to be decreased, and it is determined with which wheel the braking force is to be decreased based on output signals from a yaw rate sensor.

Figure 10:
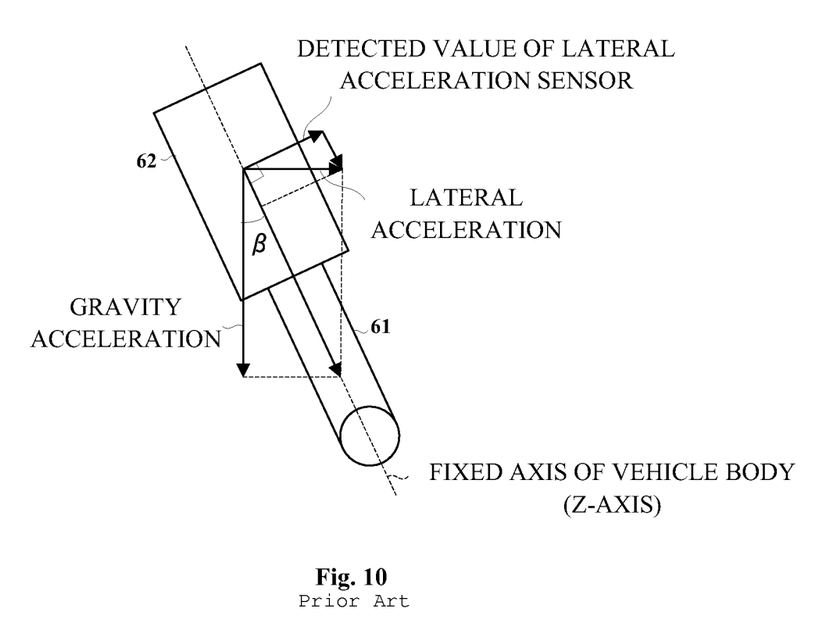
FIG. 10 is an explanatory view illustrating a detecting direction of a lateral acceleration sensor in the prior art.

In the attitude controller described in Japanese Patent 4402379, the lateral acceleration sensor installed on the vehicle is inclined along with the vehicle when travelling through a curve. Consequently, accurate lateral acceleration, i.e., horizontal acceleration orthogonal to gravity, is not detectable, causing various detected values of the lateral acceleration to depend on the bank angle. Such an inconvenience may occur. FIG. 10 illustrates conventional detection of values by the lateral acceleration sensor. Here, it is assumed that a backward/forward direction of the vehicle body is an X-axis, a lateral direction of the vehicle body is a Y-axis, and a vertical direction of the vehicle body is the Z-direction. The lateral acceleration sensor detects a horizontal acceleration value when the vehicle body 62 does not bank, but detects an orthogonal acceleration value relative to the Z-axis of the vehicle body, not the horizontal value, when the vehicle body 62 banks. The value detected by the lateral acceleration sensor varies by an angle $\beta$ in accordance with the bank angle when travelling through a curve. As a result, detection accuracy varies in accordance with the bank angle, and thus it becomes difficult to detect the skid motion of the wheel 61 as the bank angle increases. Such an inconvenience has occurred.

SUMMARY OF THE INVENTION

In view of the above description, preferred embodiments of the present invention provide an attitude controller programmed to control an attitude with high accuracy while traveling a curve independently of a bank angle, and a saddle riding type vehicle including the attitude controller.

A preferred embodiment of the present invention includes an attitude controller. The attitude controller includes a lateral acceleration obtaining unit configured to obtain lateral acceleration as rightward and leftward accelerations acting on a vehicle, a bank angle detector configured to detect a bank angle of the vehicle, and a longitudinal force controller programmed to decrease, independently of each of the wheels, an absolute value of a longitudinal force as a sum of forward and backward forces acting on each of wheels based on the obtained lateral acceleration and the detected bank angle.

With a preferred embodiment of the present invention, the lateral acceleration obtaining unit obtains the lateral acceleration, as rightward and leftward accelerations, acting on the vehicle. The bank angle detector detects the bank angle of the vehicle. The longitudinal force controller decreases, independently of each of the wheels, the absolute value of the longitudinal force as the sum of the forward and backward forces acting on each of the wheels based on the lateral acceleration and the bank angle. Consequently, an attitude of the vehicle is controlled suitably when travelling through a curve with no influence from the bank angle of the vehicle.

Moreover, it is preferable that the longitudinal force controller obtains a skid motion acceleration of each of the wheels based on the lateral acceleration and the bank angle, and decreases, independently of each of the wheels, the absolute value of the longitudinal force based on the skid motion acceleration. Specifically, the skid motion acceleration of each of the wheels is obtained such that the longitudinal force generated in each of the wheels is decreased independently of each of the wheels based on the skid motion of each of the wheels.

Moreover, the attitude controller may further include a yaw rate sensor configured to detect a yaw rate of the vehicle, and a velocity detector configured to detect a travelling velocity of the vehicle. The lateral acceleration obtaining unit obtains the lateral acceleration based on a detected value by a lateral acceleration sensor. The longitudinal force controller decreases, independently of each of the wheels, the absolute value of the longitudinal force based on the yaw rate, the travelling velocity, the lateral acceleration, and the bank angle.

With the construction of the preferred embodiment described above, the longitudinal force controller decreases the longitudinal force acting on each of the wheels independently based on the lateral acceleration, the bank angle, the yaw rate, and the travelling velocity of the vehicle. Accordingly, this achieves suitable control of the attitude with no influence from the bank angle of the vehicle.

Moreover, the attitude controller preferably further includes a roll rate sensor configured to detect a roll rate of the vehicle. The longitudinal force controller decreases, independently of each of the wheels, the absolute value of the longitudinal force also based on the detected roll rate.

The longitudinal force controller decreases the longitudinal force acting on each of the wheels independently based on the roll rate, in addition to the lateral acceleration, the yaw rate, and the bank angle. Accordingly, this construction achieves highly accurate control of the attitude of the vehicle when travelling through a curve.

Moreover, it is preferable that the longitudinal force controller further includes a skid motion acceleration calculating unit programmed to calculate a skid motion acceleration of each of the wheels based on the lateral acceleration, the yaw rate, the travelling velocity, and the bank angle.

The skid motion acceleration for each of the wheels is calculated based on the lateral acceleration, the yaw rate, the travelling velocity, and the bank angle when travelling through a curve. Since the skid motion acceleration takes into consideration the bank angle when calculating the skid motion acceleration, the skid motion acceleration is obtained with high accuracy independently of the bank angle. Accordingly, the skid motion of the vehicle when travelling through a curve is controlled accurately and independently of the bank angle, achieving attitude control.

Moreover, it is preferable that the longitudinal force controller changes a decrease amount of the absolute value of the longitudinal force based on the skid motion acceleration. The decrease amount of the absolute value of the longitudinal force is changed based on the magnitude of the skid motion acceleration, thus achieving suitable attitude control of the vehicle.

Moreover, it is preferable that the attitude controller further includes a drive force estimating unit programmed to estimate a drive force acting on each of the wheels, a braking force estimating unit programmed to estimate a braking force acting on each of the wheels, and a longitudinal force estimating unit programmed to estimate a longitudinal force as the sum of the drive force and the braking force acting on each of the wheels. With the construction of the present preferred embodiment of the present invention, the drive force and braking force acting on each of the wheels are estimated, and then the longitudinal force as the resultant of the estimated drive force and braking force is estimated. Estimation of the longitudinal force acting on each of the wheels achieves accurate control of the decrease amount of the longitudinal force.

Moreover, the longitudinal force controller may decrease the longitudinal force by decreasing the drive force. With the construction of the present preferred embodiment of the present invention, the decreased longitudinal force of the drive force and the braking force is obtained by decreasing the drive force. This achieves a stable attitude of the vehicle when travelling through a curve.

Moreover, the longitudinal force controller may decrease the drive force by decreasing injected fuel. Decreasing the injected fuel facilitates a decrease of the drive force.

Moreover, the longitudinal force controller may decrease the drive force by decreasing a transmission torque of a clutch. Decreasing the transmission torque of the clutch facilitates a decrease of the drive force.

Moreover, the longitudinal force controller may decrease the drive force by stopping ignition from a spark plug. Reducing an ignition frequency of the spark plug facilitates a decrease of the drive force.

Moreover, the longitudinal force controller may decrease the drive force by retarding an ignition timing by the spark plug. Retarding the ignition timing by the spark plug facilitates a decrease of the drive force.

Moreover, the longitudinal force controller may decrease the longitudinal force by increasing the drive force. With the construction of the present preferred embodiment of the present invention, increasing the drive force causes a decrease of the longitudinal force of the drive force and the braking force. This maintains a stable attitude of the vehicle when travelling through a curve.

Moreover, the longitudinal force controller may decrease the longitudinal force by decreasing the braking force. With the construction of the present preferred embodiment of the present invention, decreasing the braking force causes a decrease of the longitudinal force. This maintains a stable attitude of the vehicle when travelling through a curve.

Moreover, the longitudinal force controller may decrease the longitudinal force by increasing the braking force. With the construction of the present preferred embodiment of the present invention, increasing the braking force causes a decrease of the longitudinal force. This maintains a stable attitude of the vehicle when travelling through a curve.

A saddle riding type vehicle according to a preferred embodiment of the present invention includes the attitude controller described above. The attitude controller allows the attitude of the vehicle to be maintained when travelling through a curve.

According to a preferred embodiment of the present invention, the lateral acceleration obtaining unit obtains the lateral acceleration, i.e., the rightward and leftward accelerations acting on the vehicle. The bank angle detector detects the bank angle of the vehicle. The longitudinal force controller decreases, independently of each of the wheels, the absolute value of the longitudinal force based on the lateral acceleration and the bank angle acting on each of the wheels, the longitudinal force being a the sum of the forward and backward forces. This achieves suitable control of the attitude of the vehicle when travelling through a curve with no influence from the bank angle of the vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Description will be given below of preferred embodiments of the present invention with reference to drawings. Here, examples of a saddle riding type vehicle in the preferred embodiments of the present invention include a motorcycle. In the following description, the terms forward/backward and rightward/leftward are each based on a direction where the motorcycle moves forward.

Figure 1:
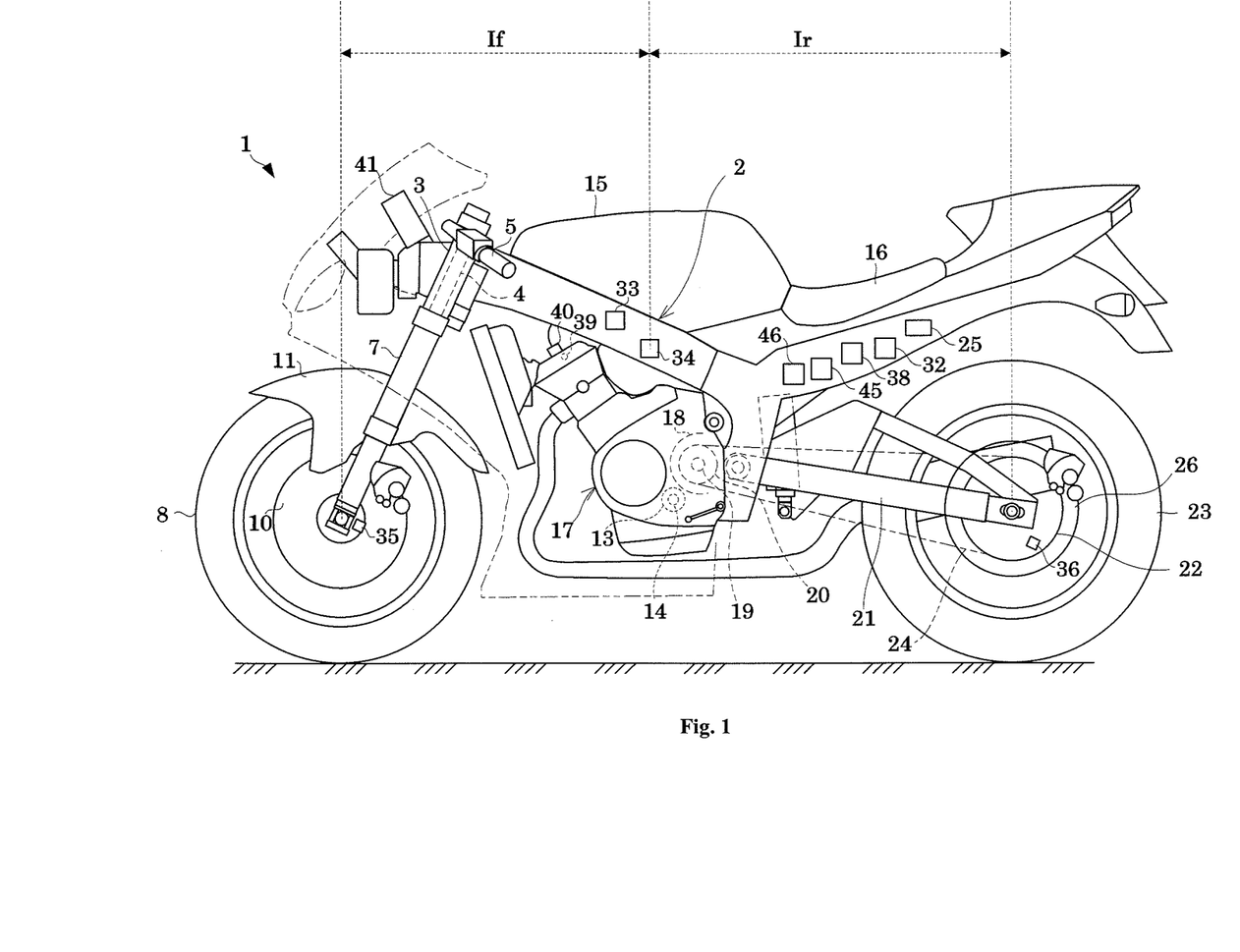
FIG. 1 is a side view of a motorcycle according to a preferred embodiment of the present invention.

FIG. 1 is a schematic side view illustrating a motorcycle with an attitude controller according to a preferred embodiment of the present invention. The motorcycle 1 includes a main frame 2. A head pipe 3 is provided on an upper portion of a front end of the main frame 2. A steering shaft 4 is inserted into the head pipe 3. A handle 5 is connected to an upper end of the steering shaft 4. A brake lever (not shown) is arranged on the right side of the handle 5.

A pair of expandable front forks 7 is connected to a lower end of the steering shaft 4. Accordingly, turning operation of the handle 5 causes the front forks 7 to turn. A front wheel 8 is rotatably mounted on lower ends of the front forks 7. Expansion of the front forks 7 absorbs vibrations from the front wheel 8. In addition, a front wheel brake 10 is mounted on the lower ends of the front forks 7. Operation of a brake lever brakes rotation of the front wheel 8. A front wheel cover 11 is fixed to the front forks 7 above the front wheel 8.

A fuel tank 15 and a seat 16 are mounted in the front-back direction on the main frame 2. An engine 17 and a transmission 18 are mounted on the main frame 2 below the fuel tank 15. A clutch 13 and a clutch actuator 14 are disposed between the engine 17 and the transmission 18, wherein the clutch actuator 14 engages or disengages the clutch 13. The transmission 18 includes a drive shaft 19 configured to output power generated in the engine 17. The drive shaft 19 is coupled to a drive sprocket 20. The clutch 13 connects or disconnects output of the power generated in the engine 17 to the drive shaft 19.

A swing arm 21 is swingingly supported on a lower rear side of the main frame 2. A driven sprocket 22 and a rear wheel 23 are rotatably supported on a rear end of the swing arm 21. A rear wheel brake 26 is provided on the rear wheel 23. The rear wheel brake 26 operates by a pedal brake (not shown). A chain 24 is suspended between the drive sprocket 20 and the driven sprocket 22. The power generated in the engine 17 is transmitted to the rear wheel 23 via the clutch 13, the transmission 18, the drive shaft 19, the drive sprocket 20, the chain 24, and the driven sprocket 22. An ECU (Electronic Control Unit) 25 is provided below the seat 16 to control operations of each unit in the motorcycle 1. A brake modulator 38 controls the brake pressure to the front wheel brake 10 and the rear wheel brake 26 in accordance with operation of the brake lever and the brake pedal. Provided on the main frame 2 are a gyroscope 33, a lateral acceleration sensor 34, a vehicle velocity detector 45, and a bank angle detector 46.

Figure 2:
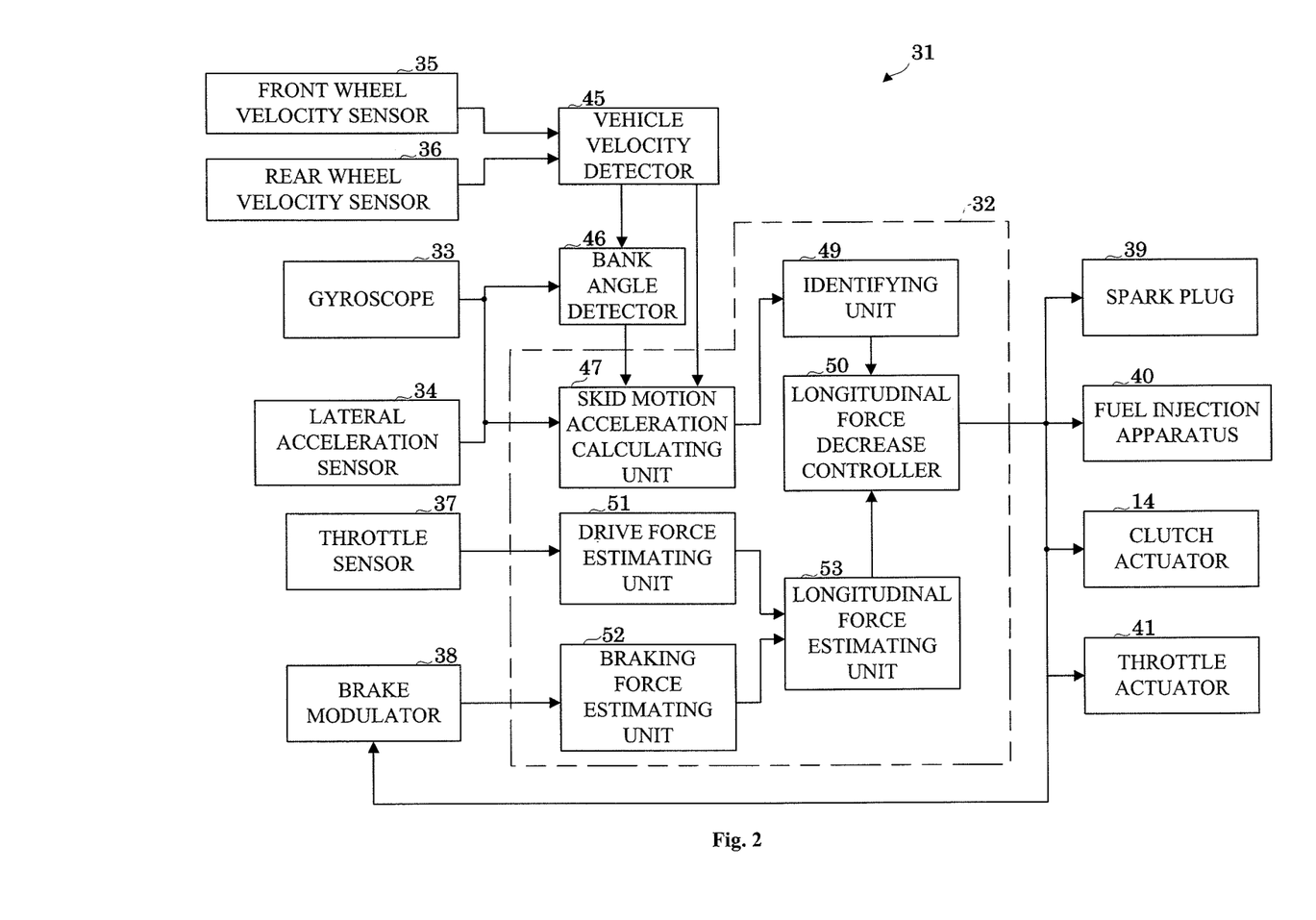
FIG. 2 is a function block diagram of an attitude controller according to a preferred embodiment of the present invention.

Description will be given next of the attitude controller 31 with reference to FIGS. 1 and 2. FIG. 2 is a function block diagram of the attitude controller. The attitude controller 31 includes a longitudinal force controller 32, the gyroscope 33, the lateral acceleration sensor 34, a front wheel velocity sensor 35, a rear wheel velocity sensor 36, a throttle sensor 37, the brake modulator 38, the vehicle velocity detector 45, and the bank angle detector 46. The attitude controller 31 may be partially incorporated into the ECU 25. Upon detection of the skid motion of the front wheel 8 or the rear wheel 23, the longitudinal force controller 32 decreases the longitudinal force of each of the wheels. Description of this is to be given in detail below.

When a rider steers the handle 5 of the motorcycle 1 when travelling through a curve, a yaw rate of the motorcycle 1 changes. When the rider inclines the vehicle body of the motorcycle 1 toward the center of the curve, a roll rate of the motorcycle 1 changes. The gyroscope 33 detects angle velocities in two axial directions of yaw and roll of the motorcycle 1. That is, the yaw rate and roll rate of the motorcycle 1 are detected. The gyroscope 33 sends detected values of the angle velocities in the two axial directions to the longitudinal force controller 32 and the bank angle detector 46. The gyroscope 33 corresponds to the yaw rate sensor and the roll rate sensor in a preferred embodiment of the present invention.

The lateral acceleration sensor 34 detects lateral acceleration of the vehicle body of the motorcycle 1. The lateral acceleration sensor 34 sends the detected value of the lateral acceleration to the longitudinal force controller 32 and the bank angle detector 46. The front wheel velocity sensor 35 detects a rotation speed of the front wheel 8. The rear wheel velocity sensor 36 detects a rotation speed of the rear wheel 23. The detected rotation speeds of the front wheel 8 and the rear wheel 23 are each outputted to a vehicle velocity detector 45. The throttle sensor 37 detects an opening degree of the throttle. The longitudinal force controller 32 receives the detected value of the throttle opening degree. The brake modulator 38 detects brake pressure of the front wheel brake 10 and the rear wheel brake 26 to adjust the brake pressure. The longitudinal force controller 32 receives the detected brake pressure in each of the wheels.

Description will be given next of the longitudinal force controller 32.

As illustrated in FIG. 2, the gyroscope 33, the lateral acceleration sensor 34, the throttle sensor 37, the brake modulator 38, the vehicle velocity detector 45, and the bank angle detector 46 are connected for input to the longitudinal force controller 32. The clutch actuator 14, the brake modulator 38, a spark plug 39, a fuel injection apparatus 40, and a throttle actuator 41 are connected for output from the longitudinal force controller 32.

The longitudinal force controller 32 includes a skid motion acceleration calculating unit 47, an identifying unit 49, a longitudinal force decrease controller 50, a drive force estimating unit 51, a braking force estimating unit 52, and a longitudinal force estimating unit 53. The longitudinal force controller 32 determines the skid motion of each of the wheels independently. Upon detection of the skid motion, the longitudinal force controller 32 performs a control so as to decrease a longitudinal force applied to each of the wheels. Description will be given next of detecting the skid motion.

The skid motion acceleration is detected based on the vehicle velocity, the bank angle, and the lateral acceleration, and the yaw rate of the motorcycle 1 to identify the skid motion of each of the wheels. The vehicle velocity detector 45 detects the vehicle velocity of the motorcycle 1 based on the detected value received from the front wheel velocity sensor 35 and the rear wheel velocity sensor 36. The detected vehicle velocity is outputted to the bank angle detector 46 and the skid motion acceleration calculating unit 47.

Figure 3:
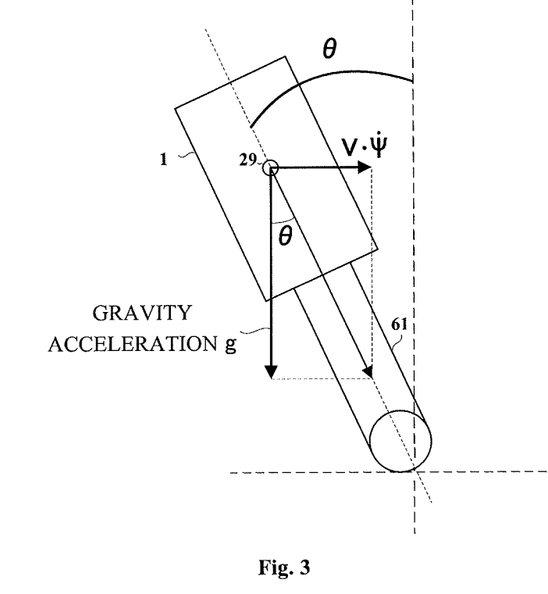
FIGS. 3 and 4 are explanatory views each illustrating the calculation of a bank angle according to a preferred embodiment of the present invention.
Figure 4:
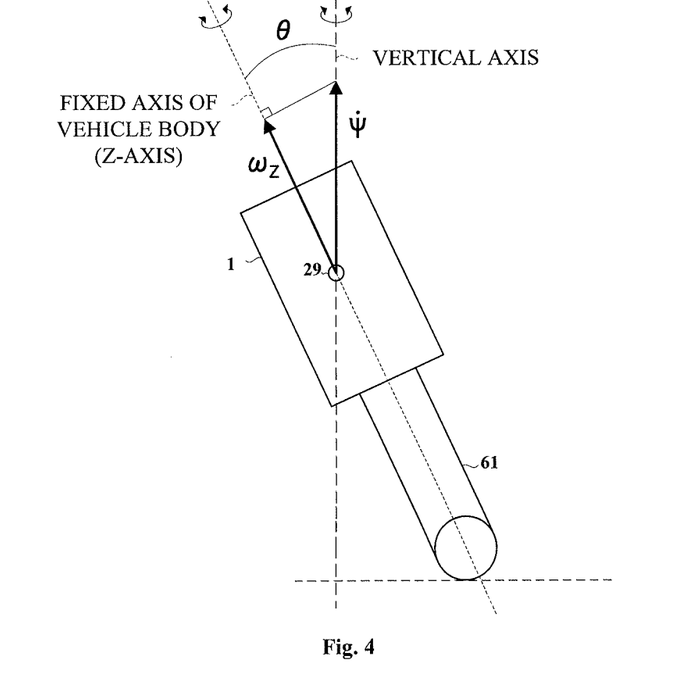

The bank angle detector 46 receives the roll rate of the motorcycle 1 from the gyroscope 33, and the lateral acceleration of the motorcycle 1 from the lateral acceleration sensor 34. The bank angle detector 46 calculates the bank angle of the motorcycle 1 based on these received values. Description will be given of one example of detecting the bank angle with reference to FIGS. 3 and 4. FIG. 3 schematically illustrates acceleration at the center of gravity 29 of the motorcycle 1. FIG. 4 schematically illustrates an angle velocity of the motorcycle 1, where a fixed axis (a Z-axis) of the vehicle body passes through the center of gravity 29 for expediency. The bank angle is detected in an ideal state where the vehicle corners at a velocity V regardless of a pitting of the vehicle body or a thickness of a tire while the attitude is lean with. Here, the lean with attitude means a state where the fixed axis (Z-axis) of the vehicle body is aligned with the upper half of a rider's body.

Now reference is made to FIG. 3. A relationship during cornering between the bank angle θ, a vehicle velocity V, a differential of a yaw angle ψ (Euler angle), and gravity acceleration g is given by the following equation, provided that a yaw rate (yaw angle velocity) as a time differential of a yaw angle is represented by (dψ/dt).

$$\theta = \arctan(V \cdot (d\psi/dt)/g) \quad (1)$$

Now reference is made to FIG. 4. A relationship during cornering between the bank angle θ, $\omega_z$ as an output value from the yaw rate sensor fixed on the vehicle body, and a differential of a yaw angle ψ (Euler angle) is given by the following equation, provided that in FIG. 4, $\omega_z$ represents an angle velocity generated around the vertical axis (the Z-axis as the vehicle body fixed axis) fixed to the vehicle body, and a length of an arrow represents a magnitude of the angle velocity. An angle velocity generated around the vertical axis is represented by (dψ/dt).

$$\theta = \arccos(\omega_z/(d\omega/dt)) \quad (2)$$

The following relationship is derived from the Equations 1 and 2.

$$\theta = \arcsin(V \cdot \omega_z/g) \quad (3)$$

The skid motion acceleration calculating unit 47 calculates the skid motion acceleration in each of the wheels based on the received vehicle velocity V, the bank angle θ, the yaw rate, and the lateral acceleration. The skid motion acceleration is calculated by the following equation, for example. Here, skid motion acceleration in the front wheel 8 is represented by dfy/dt, skid motion acceleration in the rear wheel 23 by dry/dt, and a detected value of the lateral acceleration sensor 34 is represented by Ay. In addition, a horizontal distance between an attached position of the lateral acceleration sensor 34 and the center of the front wheel 8 is represented by If, and a horizontal distance between the attached position of the lateral acceleration sensor 34 and the center of the rear wheel 23 is represented by Ir. See FIG. 1.

$$dfy/dt = -V \cdot \omega_z \cdot \sec\theta - g \cdot \tan\theta + Ay \cdot \sec\theta + If \cdot d\omega_z/dt \cdot \sec\theta \quad (4)$$

$$dry/dt = -V \cdot \omega_z \cdot \sec\theta - g \cdot \tan\theta + Ay \cdot \sec\theta - Ir \cdot d\omega_z/dt \cdot \sec\theta \quad (5)$$

Moreover, when the roll rate is also detected, the skid motion acceleration is calculated by the following equation. Here, the detected value of the roll rate is represented by wr.

$$dfy/dt = -V \cdot \omega_z \cdot \sec\theta - g \cdot \tan\theta + Ay \cdot \sec\theta + If \cdot d\omega_z/dt \cdot \sec\theta + If \cdot wr\omega_z \cdot \tan\theta \cdot \sec\theta \quad (6)$$

$$dry/dt = -V \cdot \omega_z \cdot \sec\theta - g \cdot \tan\theta + Ay \cdot \sec\theta - Ir \cdot d\omega_z/dt \cdot \sec\theta - Ir \cdot wr \cdot \omega_z \cdot \tan\theta \cdot \sec\theta \quad (7)$$

The identifying unit 49 receives the detected skid motion acceleration of the front wheel 8 and the rear wheel 23.

Figure 5:
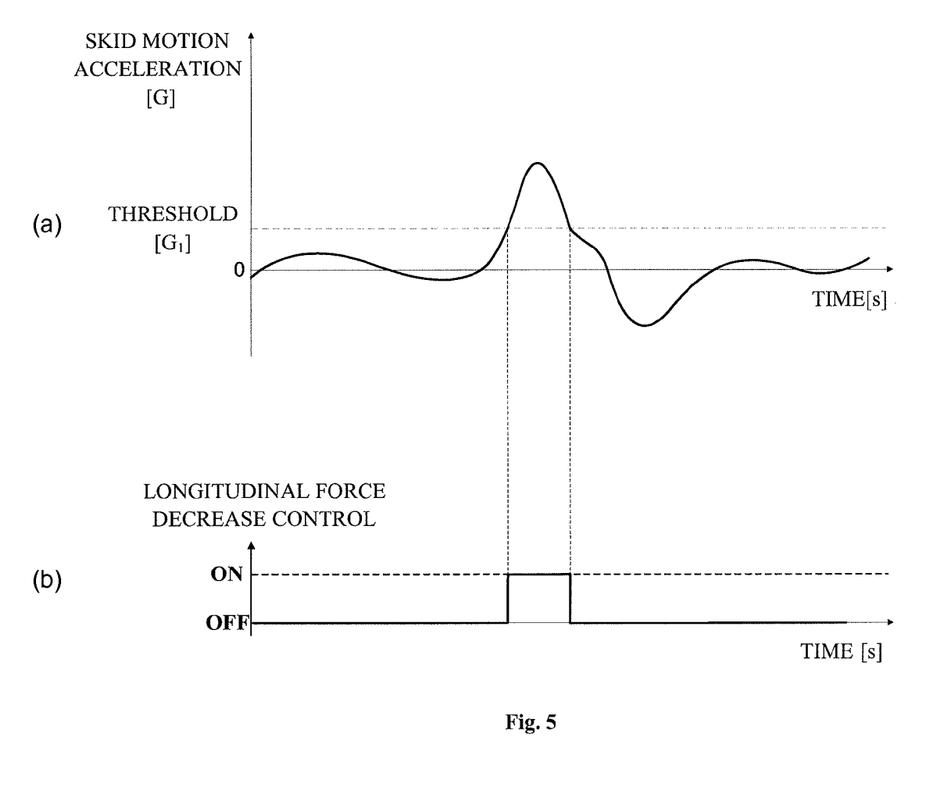
FIG. 5 illustrates two graphs, wherein (a) is a graph illustrating detection of a skid motion acceleration according to a preferred embodiment of the present invention, and (b) is a graph illustrating control of decreasing a longitudinal force relative to the detected skid motion acceleration.

The identifying unit 49 identifies whether or not the received skid motion acceleration exceeds a threshold $G_1$ provided in advance. As illustrated in graph (a) of FIG. 5, when the skid motion acceleration is the threshold $G_1$ or more, it is identified that a skid motion occurs in a target wheel. Then, the longitudinal force decrease controller 50 receives a longitudinal force decreasing control signal decreasing the longitudinal force applied to the target wheel as illustrated in graph (b) of FIG. 5. The threshold $G_1$ of the front wheel 8 may be set differently from that of the rear wheel 23. The skid motion acceleration is denoted with signs representing rightward or leftward directions. When the skid motion acceleration has a minus sign, it is identified whether or not the skid motion acceleration exceeds the threshold $-G_1$. That is, a comparison is made between the absolute value of the skid motion acceleration and the threshold $G_1$ to determine if a decrease in the longitudinal force is to be performed.

The drive force estimating unit 51 estimates a drive force generated in a driving wheel based on the detected value of the throttle sensor 37. In the present preferred embodiment, the driving wheel is the rear wheel 23. Accordingly, no drive force is generated in the front wheel 8. The longitudinal force estimating unit 53 receives the drive force of the rear wheel 23 estimated by the drive force estimating unit 51.

The braking force estimating unit 52 estimates a braking force in each of the wheels through the brake pressure detected by the brake modulator 38. The longitudinal force estimating unit 53 receives the estimated braking force for each of the wheels.

The longitudinal force estimating unit 53 calculates a longitudinal force in each of the wheels based on the received drive force and the braking force. The longitudinal force decrease controller 50 receives the calculated longitudinal force generated in each of the wheels.

The longitudinal force decrease controller 50 performs control so as to decrease the longitudinal force based on identification signals from the identifying unit 49 and the longitudinal force acting on each of the wheels received from the longitudinal force estimating unit 53. When the drive force is larger than the braking force, control is performed so as to decrease the drive force or increase the braking force. When the braking force is larger than the drive force, control is performed so as to decrease the braking force or increase the drive force.

Figure 6A:
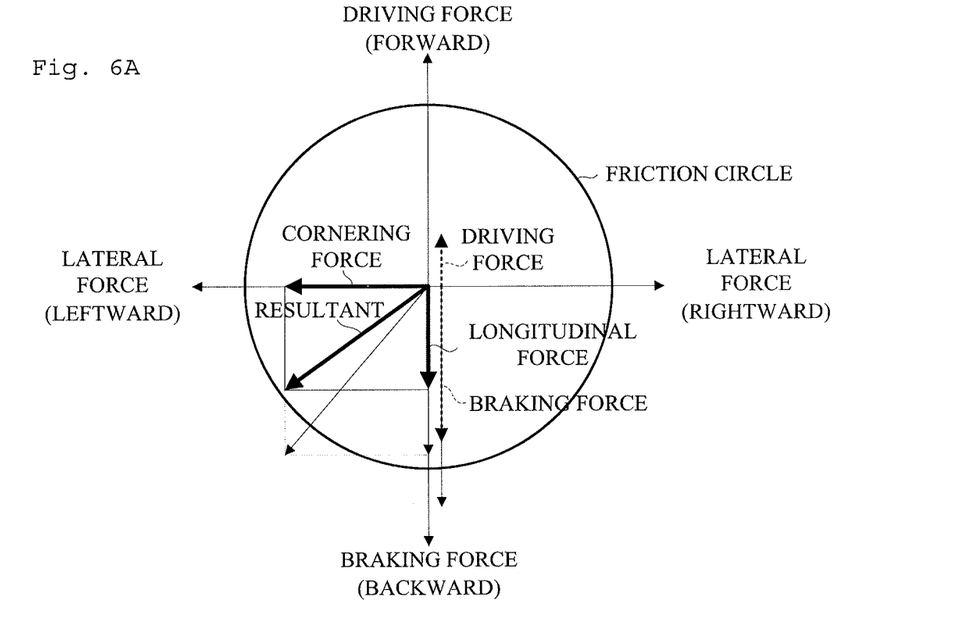
FIG. 6A and FIG. 6B are explanatory views illustrating a relationship between a force generated in a wheel and a friction circle according to a preferred embodiment of the present invention.
Figure 6B:
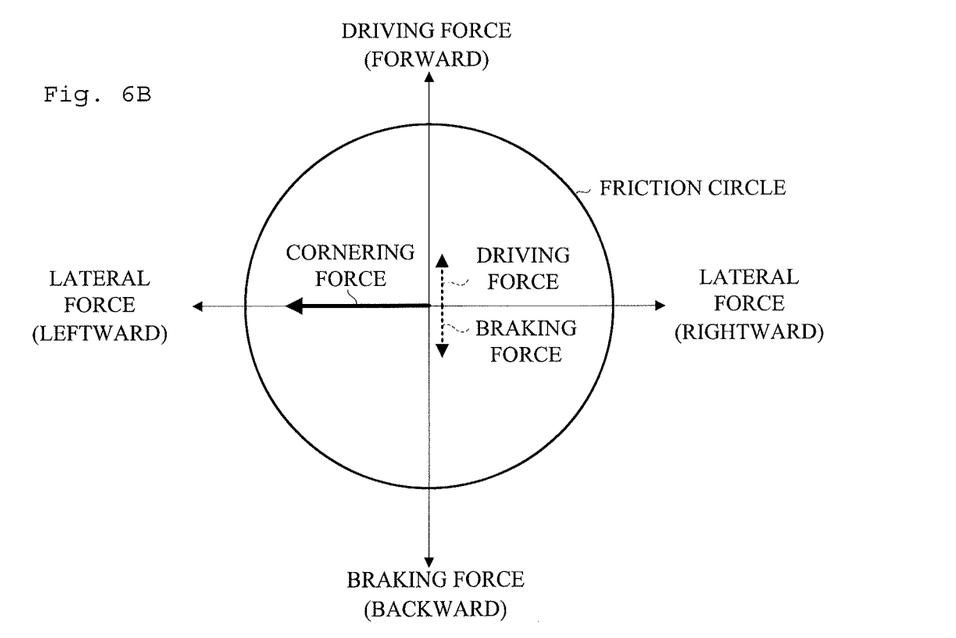

For instance, when the skid motion occurs in the motorcycle 1 in the state shown in FIG. 9, the longitudinal force as the sum of the drive force and the braking force is decreased by decreasing the braking force. See FIG. 6A. This makes the resultant of the cornering force (a lateral force) and the longitudinal force to fall within the friction circle, thus enabling the skid motion to stop. Moreover, when control is performed such that each magnitude of the drive force and the braking force is equal to each other as illustrated in FIG. 6B, the longitudinal force becomes zero. This achieves assignment of the area of the friction circle to the lateral force. Consequently, the maximum tolerance of the cornering force is obtained.

When the drive force is decreased to obtain the decreased longitudinal force, the longitudinal force decrease controller 50 performs control of the spark plug 39 so as to cut ignition such as decreasing the ignition frequency or retarding the ignition timing. Additionally, decrease of the drive force can be made by reducing or eliminating an injection quantity of fuel to the fuel injection apparatus 40. In addition, control is performed on the clutch actuator 14 so as to disengage the clutch 13, thus the drive force is decreased. When the drive force is increased to obtain the decreased longitudinal force, the longitudinal force decrease controller 50 performs control to the fuel injection apparatus 40 so as to increase the injection quantity of fuel. This achieves an increased drive force.

Moreover, with the electronic throttle, control is performed so as to open the throttle. This achieves an increased drive force.

When the braking force is increased/decreased to obtain the decreased longitudinal force, control is performed on the brake modulator 38 so as to increase/decrease the brake pressure. Alternatively, closing the throttle generates an engine brake to achieve an increased braking force. When the engine brake is generated, the engine brake is decreased by opening the throttle to achieve a decrease in the braking force. A quantity of increasing/decreasing the drive force and the braking force is adjusted in accordance with the magnitude of the longitudinal force received from the longitudinal force estimating unit 53. As noted above, when the skid motion is generated in each of the wheels, the skid motion is detected independently in each of the wheels. Then, the longitudinal force as the sum of the drive force and the braking force is decreased independently in each of the wheels to obtain the maximum tolerance amount of the lateral gripping force. Consequently, the attitude of the motorcycle 1 is controlled when travelling through a curve.

Figure 7:
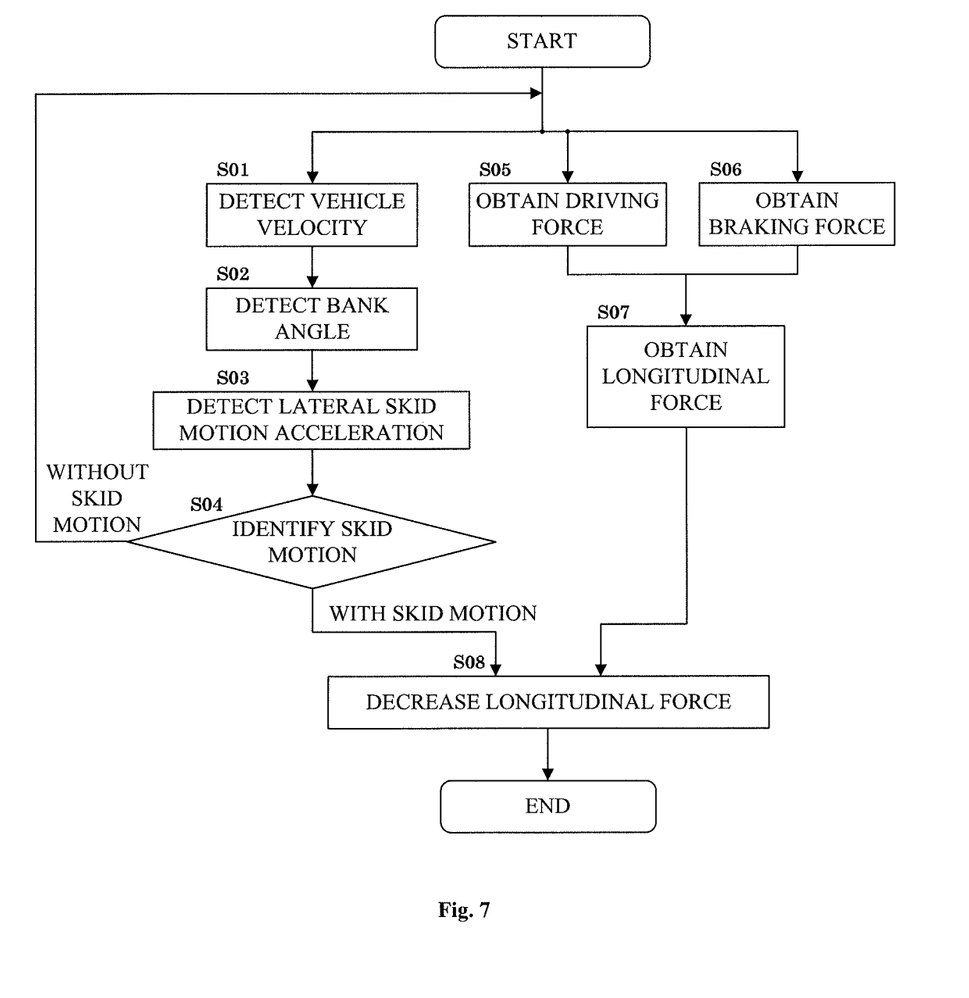
FIG. 7 is a flow chart of attitude control according to a preferred embodiment of the present invention.

Description will be given next of control of the longitudinal force controller 32 with reference to FIG. 7. FIG. 7 is a flow chart showing control the longitudinal force.

When the motorcycle 1 enters a curve, a rider travels the curve while banking the vehicle body of the motorcycle 1. The front wheel velocity sensor 35 and the rear wheel velocity sensor 36 continuously input velocity values of the front wheel 8 and the rear wheel 23 to the vehicle velocity detector 45 such that a vehicle velocity of the motorcycle 1 is detected (S01). The bank angle detector 46 detects a bank angle of the motorcycle 1 based on the detected vehicle velocity, the yaw rate received from the gyroscope 33, and the lateral acceleration received from the lateral acceleration sensor 34 (S02). The skid motion acceleration calculating unit 47 calculates the skid motion acceleration in each of the wheels based on the detected vehicle velocity, the bank angle, the yaw rate, and the lateral acceleration.

The calculated skid motion acceleration is compared with a threshold $G_1$ provided in advance such that generation of the skid motion is identified (S04). When an absolute value of the skid motion acceleration is the threshold $G_1$ or more, it is identified that the skid motion occurs in the target wheel. When an absolute value of the skid motion acceleration is less than the threshold $G_1$, it is identified that no skid motion occurs in the target wheel. Then, each state of the motorcycle 1 is again detected.

In addition, along with the steps S01 to S04, the drive force in each of the wheels is estimated such that a drive force is obtained (S05). The drive force estimating unit 51 estimates the drive force, for example, depending on a throttle opening degree detected by the throttle sensor 37. Additionally, along with the steps S01 to S05, the braking force in each of the wheels is estimated, such that a braking force is obtained (S06). The braking force estimating unit 52 estimates the braking force, for example, depending on the brake pressure in each of the wheels detected by the brake modulator 38.

The longitudinal force estimating unit 53 estimates a longitudinal force as the sum of the drive force and the braking force generated in each of the wheels based on the estimated drive force and braking force (S07). Since the drive force is opposite to the braking force, subtracting the braking force from the drive force enables estimation of the longitudinal force. This obtains the longitudinal force.

When it is identified that the skid motion occurs, the longitudinal force estimating unit 53 inputs the longitudinal force in the wheel identified that the skid motion occurs, thus decreasing the longitudinal force in correspondence with the magnitude thereof (S08). The longitudinal force is controlled to be decreased such that the drive force balances with the braking force. Consequently, the drive force or the braking force is increased or decreased depending on a magnitude relationship between the drive force and the braking force. An example of increasing the drive force include increasing a quantity of fuel ejected from the fuel injection apparatus 40. Examples of decreasing the drive force include decreasing a quantity of fuel ejected from the fuel apparatus 40, stopping ignition of the spark plug 39, or delaying the ignition timing. Another example further includes disconnecting the clutch actuator 14 to interrupt transmission of an engine torque to the rear wheel 23. Examples of increasing/decreasing the braking force include increasing/decreasing the brake pressure with the brake modulator 38.

With the preferred embodiments of the present invention described above, the bank angle detector 46 detects the bank angle of the motorcycle 1. The longitudinal force controller 32 decreases independently the longitudinal force as the sum of the drive force and the braking force generated in each of the wheels based on the lateral acceleration, the yaw rate, and the bank angle. Accordingly, the attitude is suitably controlled with no influence from the bank angle of the vehicle when travelling through a curve. Moreover, the longitudinal force controller 32 decreases independently the longitudinal force as the sum of the forward and backward forces generated in each of the wheels based on the roll rate, in addition to the lateral acceleration, the yaw rate, and the bank angle. Accordingly, this achieves highly accurate control of the attitude of the vehicle when travelling through a curve.

Moreover, the skid motion acceleration in each of the wheels is calculated when travelling through a curve based on the lateral direction acceleration, the yaw rate, the travelling velocity, the bank angle, and the roll rate. Since the skid motion acceleration has previously been a consideration for the bank angle, the skid motion acceleration is calculated with high accuracy and independently of the bank angle. Comparison is made of the skid motion acceleration to the threshold provided in advance to identify whether or not control is performed so as to decrease the longitudinal force generated in each of the wheels as the sum of the drive force and the braking force. The longitudinal force of the drive force and the braking force is controlled to be decreased in accordance with the result of the identification. Accordingly, the skid motion of the vehicle when travelling through a curve is controlled accurately and independently of the bank angle, achieving high attitude control.

Moreover, the longitudinal force controller decreases the longitudinal force by increasing or decreasing the drive force or the braking force. This achieves a stable attitude of the vehicle when travelling through a curve.

Moreover, in the motorcycle 1, control is performed such that the drive force and the braking force parallel to the travelling direction of each of the wheels have a balance. Consequently, the resultant of the drive force and the braking force is decreased, and the tolerance amount of a gripping force in the wheel is assigned entirely to the cornering force. This achieves a suitable attitude of the motorcycle 1 when travelling through a curve.

The present invention is not limited to the foregoing preferred embodiments, but may be modified as described below.

In the foregoing preferred embodiments, the travelling velocity of the motorcycle 1 is preferably detected with the front wheel velocity sensor 35, the rear wheel velocity sensor 36, and the vehicle velocity detector 45. This is not limitative. For instance, the travelling velocity may be detected through a relationship between a moving distance and a moving period of time with use of a GPS (Global Positioning System). Alternatively, the lateral acceleration of the motorcycle 1 may be detected with the GPS instead of the lateral acceleration sensor 34.

The foregoing preferred embodiments relate to the motorcycle 1 including an engine as a power source as a non-limiting example. Alternatively, the foregoing preferred embodiments may relate to an electrically-powered motorcycle including a motor as a power source. In this case, increase/decrease of the drive force and the braking force is controlled through increase/decrease of a motor torque.

In the foregoing preferred embodiments, the motorcycle has been described as one example of a saddle riding type vehicle. This is not limitative. For instance, a vehicle whose wheels lean may be used.

In the foregoing preferred embodiments, the bank angle detector 46 preferably performs a calculation based on the vehicle velocity, the yaw rate, and the lateral acceleration. This is not limitative. For instance, the detected value of the roll rate may also be used as input data to be calculated. The bank angle may be detected based on a detected value by a distance meter to determine a distance above the ground. Moreover, the bank angle may be detected through image processing by a camera provided to image an area ahead of the motorcycle 1.

Besides the methods of decreasing the longitudinal force described in the foregoing preferred embodiments, the longitudinal force may be decreased through increase/decrease of a torque by variation in the transmission gear ratio when the motorcycle is provided with a Continuously Variable Transmission (CVT).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An attitude controller comprising:
   a lateral acceleration obtaining unit that obtains a lateral acceleration as rightward and leftward accelerations acting on a vehicle;
   a bank angle detector that detects a bank angle of the vehicle; and
   a longitudinal force controller programmed to decrease, independently of each wheel of the vehicle, an absolute value of a longitudinal force as a sum of forward and backward forces acting on each of the wheels based on the obtained lateral acceleration and the detected bank angle; wherein
   the longitudinal force controller obtains a skid motion acceleration of each of the wheels based on the lateral acceleration, a yaw rate, a travelling velocity, and the bank angle, and is programmed to decrease, independently of each of the wheels, the absolute value of the longitudinal force in accordance with the skid motion acceleration.

2. The attitude controller according to claim 1, further comprising:
   a yaw rate sensor that detects the yaw rate of the vehicle; and
   a velocity detector that detects the travelling velocity of the vehicle; wherein
   the lateral acceleration obtaining unit obtains the lateral acceleration based on a detected value that is detected by a lateral acceleration sensor; and
   the longitudinal force controller is programmed to decrease, independently of each of the wheels, the absolute value of the longitudinal force based on the yaw rate, the travelling velocity, the lateral acceleration, and the bank angle.

3. The attitude controller according to claim 2, further comprising:
   a roll rate sensor that detects a roll rate of the vehicle; wherein
   the longitudinal force controller is programmed to decrease, independently of each of the wheels, the absolute value of the longitudinal force also based on the detected roll rate.

4. The attitude controller according to claim 1, further comprising:
   a drive force estimating unit programmed to estimate a drive force acting on each of the wheels;
   a braking force estimating unit programmed to estimate a braking force acting on each of the wheels; and
   a longitudinal force estimating unit programmed to estimate a longitudinal force, as a sum of the drive force and the braking force, acting on each of the wheels.

5. The attitude controller according to claim 1, wherein the longitudinal force controller is programmed to decrease the longitudinal force by decreasing a drive force.

6. The attitude controller according to claim 5, wherein the longitudinal force controller is programmed to decrease the drive force by decreasing an amount of injected fuel.

7. The attitude controller according to claim 5, wherein the longitudinal force controller is programmed to decrease the drive force by decreasing a transmission torque of a clutch.

8. The attitude controller according to claim 5, wherein the longitudinal force controller is programmed to decrease the drive force by reducing an ignition frequency of a spark plug.

9. The attitude controller according to claim 5, wherein the longitudinal force controller is programmed to decrease the drive force by retarding an ignition timing.

10. The attitude controller according to claim 1, wherein the longitudinal force controller is programmed to decrease the longitudinal force by increasing a drive force.

11. The attitude controller according to claim 1, wherein the longitudinal force controller is programmed to decrease the longitudinal force by decreasing a braking force.

12. The attitude controller according to claim 1, wherein the longitudinal force controller is programmed to decrease the longitudinal force by increasing a braking force.

13. A saddle riding type vehicle including the attitude controller according to claim 1.

* * * * *